US012732448B2

(12) United States Patent
Camarillo Garvia et al.

(10) Patent No.: US 12,732,448 B2
(45) Date of Patent: Sep. 8, 2026

(54) PATH TRACING APPLIED TO INTERNET PROTOCOL VERSION 6 (IPV6) FABRICS

(71) Applicant: Cisco Technology, Inc., San Jose, CA (US)

(72) Inventors: Pablo Camarillo Garvia, Madrid (ES); Clarence Filsfils, Brussels (BE); Ahmed Mohamed Ahmed Abdelsalam, L'Aquila (IT); Jisu Bhattacharya, San Jose, CA (US); Rakesh Gandhi, Ontario (CA); Sonia Ben Ayed, Vanves (FR)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 18/758,755

(22) Filed: Jun. 28, 2024

(65) Prior Publication Data

US 2025/0150376 A1 May 8, 2025

Related U.S. Application Data

(60) Provisional application No. 63/596,852, filed on Nov. 7, 2023.

(51) Int. Cl.
*H04L 43/12* (2022.01)
*H04L 43/10* (2022.01)
(Continued)

(52) U.S. Cl.
CPC .............. *H04L 43/12* (2013.01); *H04L 43/10* (2013.01)

(58) Field of Classification Search
CPC ..... H04L 43/12; H04L 43/10; H04L 41/0631; H04L 41/0823; H04L 41/0895;
(Continued)

(56) References Cited

U.S. PATENT DOCUMENTS

| | | | | |
|---|---|---|---|---|
| 2008/0159287 | A1* | 7/2008 | Nagarajan | H04L 69/22 370/252 |
| 2017/0324659 | A1 | 11/2017 | Liu | |

(Continued)

FOREIGN PATENT DOCUMENTS

| | | | | |
|---|---|---|---|---|
| WO | WO-2022033034 A1 * | 2/2022 | | H04L 43/10 |
| WO | 2022199365 A1 | 9/2022 | | |
| WO | 2023114351 A1 | 6/2023 | | |

OTHER PUBLICATIONS

Filsfils C., et al., "Path Tracing in SRv6 networks", draft-filsfils-spring-path-tracing-05, Intended Status: Standards Track, Oct. 23, 2023, 17 Pages.

*Primary Examiner* — Kamal M Hossain
(74) *Attorney, Agent, or Firm* — Polsinelli P.C.

(57) ABSTRACT

Systems and techniques are provided for path tracing. For example, a process can include establishing a path tracing session associated with path tracing (PT) probe packets from a PT source node of an IPv6 network fabric. A PT probe packet can be received with a first IPv6 Destination Options Header with Path Tracing Option (DOH-PT) header that encodes path tracing information of the PT source node and indicates respective path tracing information for each PT midpoint node along a path from the PT source node to a PT sink node of the IPv6 network fabric. The received PT probe packet can be updated to include a second DOH-PT header that encodes path tracing information of the PT sink node. An updated PT probe packet includes the first and second DOH-PT headers and can be encapsulated with an additional IPv6 header corresponding to forwarding information of a collector node.

18 Claims, 8 Drawing Sheets

(51) Int. Cl.

| | |
|---|---|
| *H04L 41/0631* | (2022.01) |
| *H04L 41/082* | (2022.01) |
| *H04L 41/0823* | (2022.01) |
| *H04L 41/0895* | (2022.01) |
| *H04L 41/122* | (2022.01) |
| *H04L 41/5009* | (2022.01) |
| *H04L 41/5019* | (2022.01) |
| *H04L 43/0811* | (2022.01) |
| *H04L 43/0852* | (2022.01) |
| *H04L 43/20* | (2022.01) |
| *H04L 45/00* | (2022.01) |

(58) Field of Classification Search

CPC ............... H04L 41/122; H04L 41/5009; H04L 41/5019; H04L 43/0811; H04L 43/0852; H04L 43/20; H04L 41/082; H04L 45/26

See application file for complete search history.

(56) References Cited

U.S. PATENT DOCUMENTS

2023/0254246 A1 8/2023 Filsfils et al.
2023/0344752 A1 * 10/2023 Wang .................... H04L 45/566

* cited by examiner 510-2
Version | Traffic Class | Flow Label
Payload Length | Next Header | Hop Limit
SA
DA 550-2
Next Header | Header Ext Len | Option Type | Option Data Len
T64
Session ID | IF_ID | IF_LD

575

510-1
*Version* | *Traffic Class* | *Flow Label*
*Payload Length* | *Next Header* | *Hop Limit*
*SA*
*DA*

530-1
*Next Header* | *Header Ext Len* | *Option Type* | *Option Data Len*
*MCD Stack*

550-1
*Next Header* | *Header Ext Len* | *Option Type* | *Option Data Len*
*T64*
*Session ID* | *IF_ID* | *IF_LD*

562
*Padding*

505

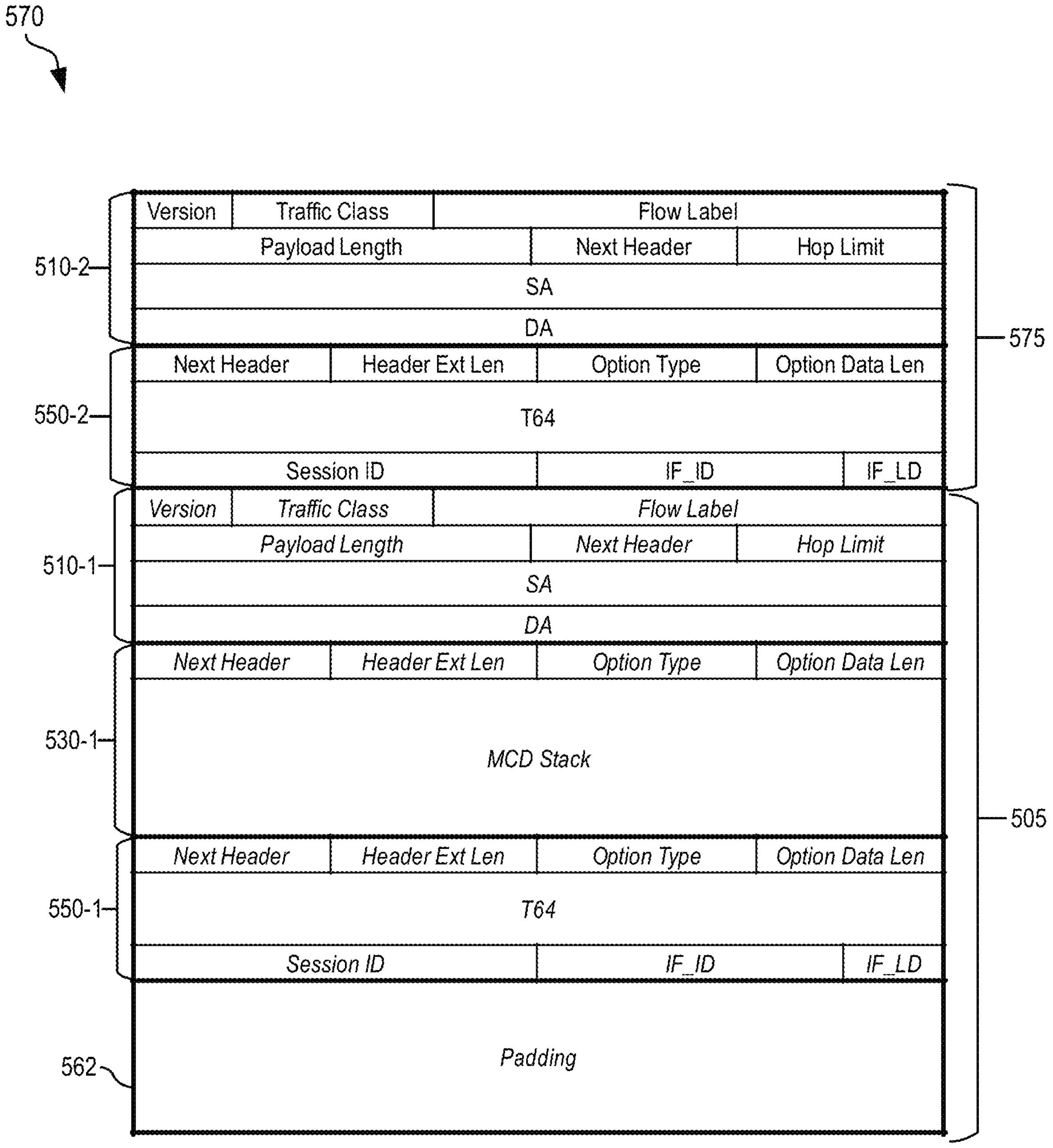

FIG. 5B

Establish a path tracing session corresponding to transmission of a plurality of path tracing (PT) probe packets from a PT source node, wherein the PT source node is included in an IPv6 network fabric
602

Receive a PT probe packet with a first IPv6 Destination Options Header with Path Tracing Option (DOH-PT) header that encodes path tracing information of the PT source node, wherein the received PT probe packet is further indicative of respective path tracing information for each PT midpoint node of a plurality of PT midpoint nodes along a path from the PT source node to a PT sink node included in the IPv6 network fabric
604

Update the received PT probe packet to include a second DOH-PT header that encodes path tracing information of the PT sink node, wherein an updated PT probe packet includes the first DOH-PT header and the second DOH-PT header
606

Encapsulate the updated PT probe packet with an additional IPv6 header corresponding to forwarding information of a collector node
608

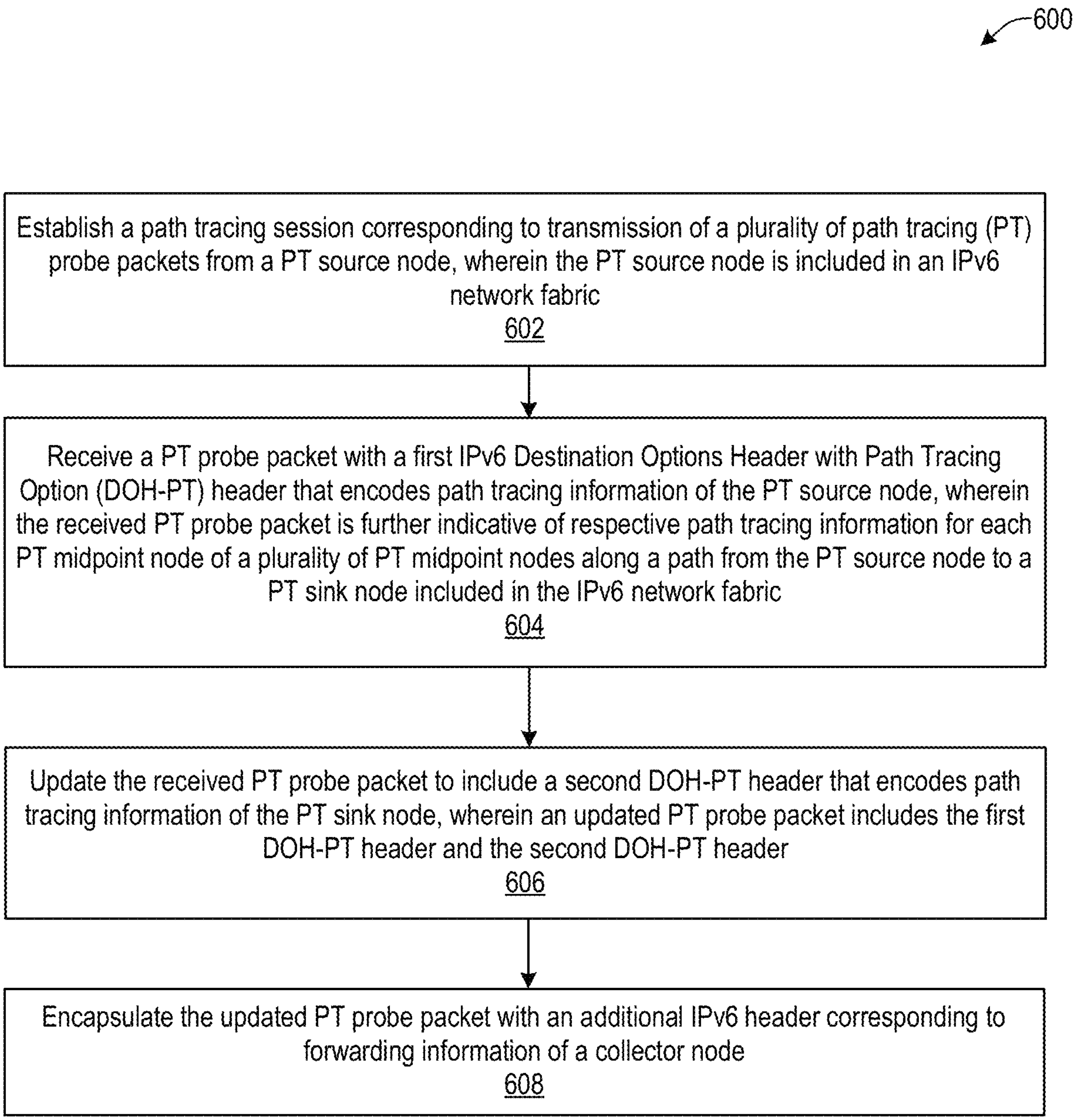

FIG. 6

PATH TRACING APPLIED TO INTERNET PROTOCOL VERSION 6 (IPV6) FABRICS

CROSS-REFERENCE TO RELATED APPLICATIONS

This application claims the benefit of U.S. Provisional Patent Application No. 63/596,852, entitled, “Path Tracing Applied to Internet Protocol Version 6 (IPV6) Fabrics”, and filed Nov. 7, 2023, which is hereby incorporated by reference, in its entirety and for all purposes.

FIELD OF DISCLOSURE

The present technology generally relates to the field of computer networking, and more particularly, to systems and techniques for performing path tracing in various IPv6 network fabrics without segment routing dependencies.

BACKGROUND

Path tracing techniques can be used for network monitoring and analysis, playing a crucial role in ensuring the reliability, security, and performance of data packet delivery in a network environment. By systematically tracking the paths that data packets follow across intricate network environments, path tracing provides network administrators and systems with valuable insights. Path tracing enables the ability to analyze routing patterns, measure latency, and assess the quality of service (QoS) in real-world network conditions. Moreover, path tracing serves as a tool for troubleshooting connectivity issues, swiftly identifying the source of problems, whether they stem from routing misconfigurations, network congestion, or hardware failures. Additionally, path tracing aids in security and anomaly detection by revealing irregular packet routes, thus helping to identify potential network threats. Path tracing’s role in optimizing routing further enhances network efficiency.

Embracing IPv6 for path tracing within network environments represents a critical step toward optimizing network performance and ensuring efficient data packet monitoring and analysis. The transition to IPv6 offers numerous advantages that significantly bolster path tracing capabilities. One of the foremost advantages is the substantial expansion of the address space provided by IPv6 in comparison to IPv4. This surplus of unique IPv6 addresses introduces a higher degree of granularity for routing, enabling more precise tracking of packet routes and reducing the likelihood of address conflicts. In turn, this addresses a fundamental requirement for accurate and efficient path tracing. Additionally, IPv6’s streamlined header format is another compelling factor. With fewer fields in the header, IPv6 simplifies the extraction of routing and addressing information from packet headers. This streamlined approach enhances the efficiency of path tracing by providing a more straightforward means of obtaining crucial data about packet routes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5B illustrates an example of the encapsulated PT probe packet data structure of FIG. 5A, in accordance with some aspects of the present technology;

FIG. 6 an example process for performing path tracing within a network environment, in accordance with some aspects of the present technology.

DETAILED DESCRIPTION

Figure 1:
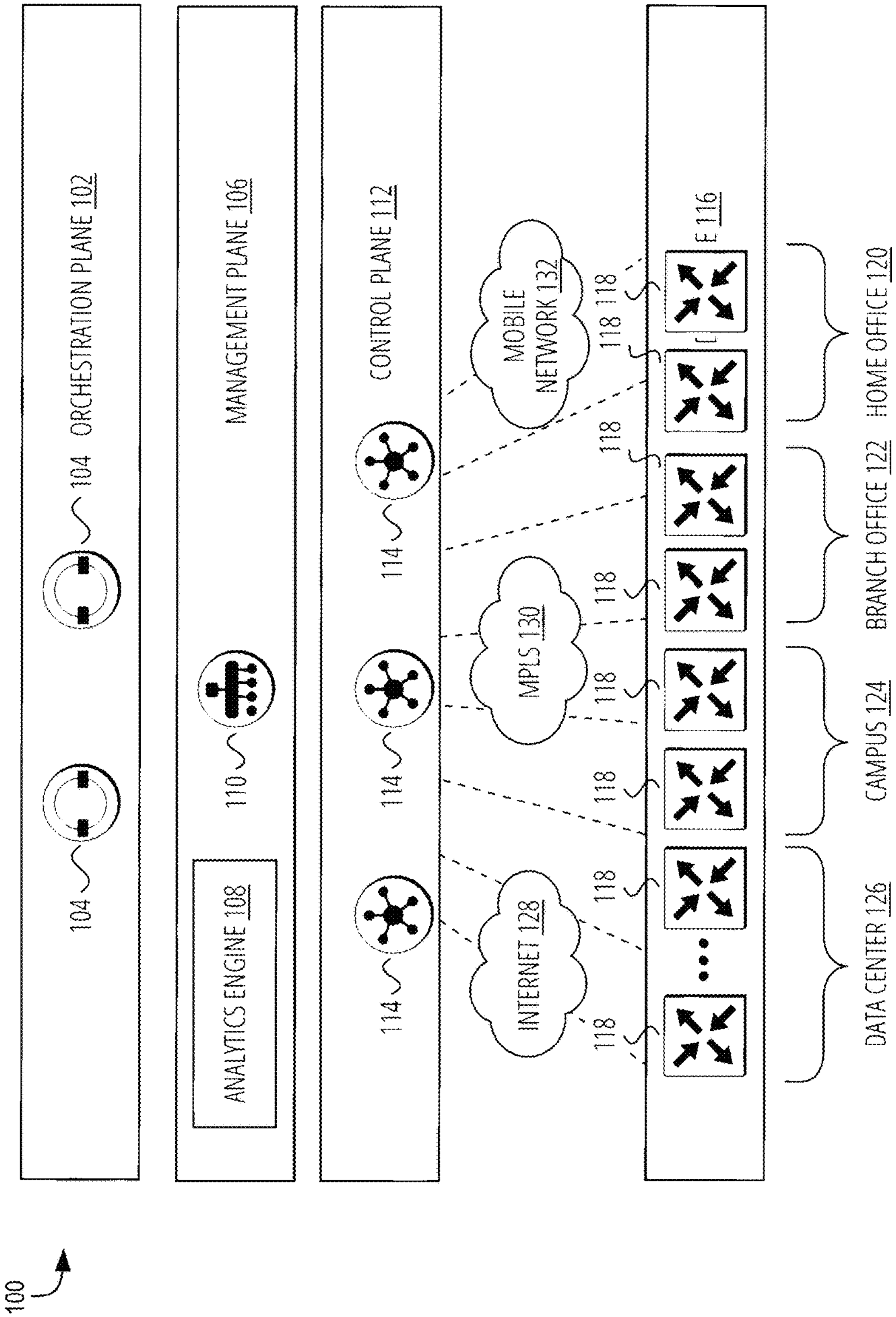
FIG. 1 illustrates an example of a high-level network architecture, in accordance with some aspects of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to “one embodiment” or “an embodiment” means that a particular feature, structure, or characteristic described in connection with the embodiment is included in at least one embodiment of the disclosure. The appearances of the phrase “in one embodiment” in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Path Tracing (PT) techniques can be used for network monitoring and analysis, and provide a record of the packet path as a sequence of interface IDs. For example, path tracing information for a particular packet on a path from a source node to a sink node can include a sequential listing of the nodes that are traversed by the packet along its path from source to sink. Each node on the path can update the path tracing information with its interface/node ID, as well as respective timestamp information. For example, each node's path tracing information can include a timestamp indicating when the node received the packet and/or indicating when the node forwarded the packet to the next node on the path. Accordingly, path tracing information can be used to provide a record of end-to-end delay, per-hop delay, and load on each egress interface along the packet delivery path. Path tracing can be used for both SRv6 (Segment Routing over IPv6) and SR-MPLS (Segment Routing with Multiprotocol Label Switching) network environments.

Path tracing provides advantages that can include the ability to detect and pinpoint data plane forwarding issues (e.g., identifying black-holing paths, wrong or non-expected paths, paths with incoherent latency, etc.). Currently, path tracing implementations have several SRv6 dependencies, which limit the deployment of path tracing to SRv6 networks only. For example, existing path tracing implementations use a segment routing header (SRH) to encode and carry the PT information (Path Tracing information) of the PT source and PT sink nodes of a given path that is being traced. In particular, the path tracing information is encoded in an SRH PT-TLV header (Segment Routing Header Path Tracing Type-Length-Value) that is unique to SRv6 networks and is not more widely available for any IPv6 fabric. Existing path tracing implementations also use an SRv6-specific endpoint called "Endpoint Behavior bound to an SRv6 Policy with Timestamp, Encapsulation and Forward"—also referred to in the short form as the "End.B6.TEF" endpoint—to forward Path Tracing probes from the PT sink node at the end of a path, to the Regional Collector (RC) that is responsible for aggregating and analyzing the PT information for a network.

Accordingly, existing path tracing implementations are limited to deployment within SRv6 networks, and cannot be deployed more generally in any IPv6 network fabric. There is a need for solutions that can be used to deploy Path Tracing in any IPv6 network and/or any IPv6 fabric, without SRv6 dependencies for encoding the path tracing information and without SRv6 dependencies for triggering the PT sink node to forward path tracing probes to the Regional Collector. In some aspects, the disclosed technology provides a solution directed towards extending the reach of path tracing, thereby addressing the challenge of deploying path tracing within any IPv6 fabric.

For example, disclosed are systems, apparatuses, methods, and computer-readable media that can be used to implement and/or enable path tracing deployments in any IPv6 fabric or network environment, in accordance with some embodiments. In one illustrative example, a method for path tracing is provided, the method comprising: establishing a path tracing session corresponding to the transmission of a plurality of path tracing (PT) probe packets from a PT source node, wherein the PT source node is included in an IPv6 network fabric; receiving a PT probe packet with a first IPv6 Destination Options Header with Path Tracing Option (DOH-PT) header that encodes path tracing information of the PT source node, wherein the received PT probe packet is further indicative of respective path tracing information for each PT midpoint node of a plurality of PT midpoint nodes along a path from the PT source node to a PT sink node included in the IPv6 network fabric; updating the received PT probe packet to include a second DOH-PT header that encodes path tracing information of the PT sink node, wherein an updated PT probe packet includes the first DOH-PT header and the second DOH-PT header; and encapsulating the updated PT probe packet with an additional IPv6 header corresponding to forwarding information of a collector node.

In some aspects, the PT probe packet with the first DOH-PT header is received by the PT sink node and from the PT source node.

In some aspects, the collector node is a path tracing Regional Collector (RC) node associated with one or more of the PT sink node or the PT source node.

In some aspects, the received PT probe packet with the first DOH-PT header further includes a Hop-by-Hop Path Tracing (HbH-PT) header indicative of the respective path tracing information for each PT midpoint node of the plurality of PT midpoint nodes along the path from the PT source node to the PT sink node.

In some aspects, updating the received PT probe packet with the first DOH-PT header comprises: appending, by the PT sink node, the second DOH-PT header to the received PT probe packet with the first DOH-PT header.

In some aspects, encapsulating the updated PT probe packet with the additional IPv6 header is performed by the PT sink node.

In some aspects, the method further comprises: transmitting, by the PT source node, the PT probe packet with the first DOH-PT header that encodes path tracing information of the PT source node.

In some aspects, the PT sink node generates the updated PT probe packet based on appending the second DOH-PT header to the first DOH-PT header of the received PT probe packet, and wherein the second DOH-PT header is separate from the first DOH-PT header.

In some aspects, the PT sink node generates the updated PT probe packet to include the second DOH-PT header within the first DOH-PT header.

In some aspects, the PT sink node and the PT source node are included in the same IPv6 network fabric.

In some aspects, the IPv6 network fabric is not a Segment Routing over IPv6 (SRv6) network fabric.

In some aspects, the PT probe packet does not include a Segment Routing Header (SRH) path tracing Type-Length-Value (TLV) field (SRH PT-TLV field).

In another illustrative example, a system is provided, the system comprising: one or more processors; and one or more computer-readable storage media having computer-readable instructions stored thereon, wherein the computer-readable instructions, when executed by the one or more processors, cause the one or more processors to: establish a path tracing session corresponding to the transmission of a plurality of path tracing (PT) probe packets from a PT source node, wherein the PT source node is included in an IPv6 network fabric; receive a PT probe packet with a first IPv6 Destination Options Header with Path Tracing Option (DOH-PT) header that encodes path tracing information of the PT source node, wherein the received PT probe packet is further indicative of respective path tracing information for each PT midpoint node of a plurality of PT midpoint nodes along a path from the PT source node to a PT sink node included in the IPv6 network fabric; update the received PT probe packet to include a second DOH-PT header that encodes path tracing information of the PT sink node, wherein an updated PT probe packet includes the first DOH-PT header and the second DOH-PT header; and encapsulate the updated PT probe packet with an additional IPv6 header corresponding to forwarding information of a collector node.

In some aspects, the PT probe packet with the first DOH-PT header is received by the PT sink node and from the PT source node.

In some aspects, the received PT probe packet with the first DOH-PT header further includes a Hop-by-Hop Path Tracing (HbH-PT) header indicative of the respective path tracing information for each PT midpoint node of the plurality of PT midpoint nodes along the path from the PT source node to the PT sink node.

In some aspects, to update the received PT probe packet, the one or more processors are configured to: append, by the PT sink node, the second DOH-PT header to the received PT probe packet with the first DOH-PT header.

In some aspects, to update the received PT probe packet, the one or more processors are configured to: generate, by the PT sink node, the updated PT probe packet to include the second DOH-PT header within information of the first DOH-PT header.

In some aspects, the PT sink node is configured to encapsulate the updated PT probe packet with the additional IPv6 header.

In some aspects, the IPv6 network fabric is not a Segment Routing over IPv6 (SRv6) network fabric.

In another illustrative example, one or more non-transitory computer-readable media are provided comprising computer-readable instructions, which when executed by one or more processors, cause the one or more processors to: establish a path tracing session corresponding to the transmission of a plurality of path tracing (PT) probe packets from a PT source node, wherein the PT source node is included in an IPv6 network fabric; receive a PT probe packet with a first IPv6 Destination Options Header with Path Tracing Option (DOH-PT) header that encodes path tracing information of the PT source node, wherein the received PT probe packet is further indicative of respective path tracing information for each PT midpoint node of a plurality of PT midpoint nodes along a path from the PT source node to a PT sink node included in the IPv6 network fabric; update the received PT probe packet to include a second DOH-PT header that encodes path tracing information of the PT sink node, wherein an updated PT probe packet includes the first DOH-PT header and the second DOH-PT header; and encapsulate the updated PT probe packet with an additional IPv6 header corresponding to forwarding information of a collector node.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As noted above, Path Tracing (PT) techniques can be used for network monitoring and analysis, based on using the path tracing techniques to provide and/or obtain a record of a packet path as a sequence of interface IDs. For example, path tracing information (PT information) determined for a particular packet on a path from a source node to a sink node can include a sequential listing of the nodes that are traversed by the packet along its path from source to sink. The path of the packet from the PT source node to the PT sink node can include one or more (or a plurality of) PT midpoint nodes, with the final path tracking information for the packet corresponding to the path: PT source node, PT midpoint node 1, . . . , PT midpoint node N, PT sink node.

Each respective node on the path can update the accumulated path tracing information with the corresponding interface/node ID information of the respective node, as well as respective timestamp information. The path tracing information can also record information such as the end-to-end delay, per-hop delay, and/or load on each egress interface along the packet delivery path. This method can be applied to both SRv6 and SR-MPLS. Path tracing techniques can be used to detect any forwarding issues in the data plane, including black-holed paths, wrong/non-expected paths, or paths with incoherent latency. Using a 40-byte IPv6 Hop-by-Hop (HbH) extension header, path tracing techniques can be applied to trace up to 14 hops.

Path tracing techniques may rely on one or more SRv6 dependencies, which limits the deployment of path tracing to SRv6 networks only. For example, the path tracing SRv6 dependencies may be based on the use of a segment routing header (SRH) to encode and carry the PT information (Path Tracing information) of the PT source and PT sink nodes of a given path that is being traced. In particular, existing path tracing techniques utilize the Segment Routing Header Path Tracing Type-Length-Value (SRH PT-TLV) to encode the PT information of the PT source and PT sink nodes, and the SRH PT-TLV header is unique to SRv6 networks (e.g., is an SRv6 dependency that limits path tracing deployments to within SRv6 networks). Existing path tracing techniques may additionally utilize an SRv6 endpoint, referred to as "Endpoint Behavior bound to an SRv6 Policy with Timestamp, Encapsulation, and Forward" (End.B6.TEF), to enable the forwarding of PT probes from the PT sink node to a Regional Collector (RC) node. It is currently not possible to deploy Path Tracing in IPv6 Fabric due to its dependencies on SRv6 networks. However, the systems and techniques described herein provide a solution that enables the deployment of Path Tracing in any IPv6 Fabric. The solution involves defining a new IPv6 Option, called DOH-PT, for Path Tracing. This option is carried in the IPv6 Destination Options Header and encodes the information of the PT Source and PT Sink. Moreover, the technology being proposed introduces a new feature in which the PT Sink node is defined to forward path-tracing probes to the Regional Collector (RC). This feature is activated when the received packet contains DOH-PT, and it replaces the SRv6 End.B6.TEF feature. The proposed solution fully utilizes the Midpoint behavior using PT header (HbH-PT) that was developed for SRv6 Path Tracing.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more network orchestrator appliances 104 (physical or virtual). The one or more network orchestrator appliances 104 can perform the initial authentication of the edge network devices 118 and orchestrate connectivity between devices of the control plane 112 and the data plane 116. In some embodiments, the one or more network orchestrator appliances 104 can also enable communication of devices located behind Network Address Translation (NAT). In some embodiments, physical or virtual Cisco® SD-WAN vBond appliances can operate as the one or more network orchestrator appliances 104.

The management plane 106 can be responsible for central configuration and monitoring of a network. The management plane 106 can include one or more network management appliances 110 (physical or virtual). In some embodiments, the one or more network management appliances 110 can provide centralized management of the network via a graphical user interface to enable a user to monitor, configure, and maintain the edge network devices 118 and links (e.g., Internet 128, MPLS network 130, 4G/Mobile network 132) in an underlay and overlay network. The one or more network management appliances 110 can support multi-tenancy and enable centralized management of logically isolated networks associated with different entities (e.g., enterprises, divisions within enterprises, groups within divisions, etc.). Alternatively or in addition, the one or more network management appliances 110 can be a dedicated network management system for a single entity. In some embodiments, physical or virtual Cisco® SD-WAN vManage appliances can operate as the one or more network management appliances 110. In some examples, the analytics engine 108 can be used to implement, provide, and/or determine routing analytics information associated with the network architecture 100. For example, the analytics engine 108 can determine routing analytics information based on the analytics engine 108 receiving one or more inputs indicative of the measured PT analytics data of ECMP paths between two nodes (e.g., received from a path tracing regional collector, such as the collector 316 of FIG. 3). The network and/or routing analytics provided by the analytics engine 108 can be implemented based on or using routing analytics (RA), including topology analytics (TA) and path analytics (PA) modules. In some examples, RA information can be determined by the analytics engine 108 using the network topology and paths between two nodes in the network to compute a set of all possible ECMP paths, including a respective cumulative latency for each of the possible ECMP paths (e.g., based on link latency metrics from the topology database). View information of the current topology associated ECMP paths between two nodes and the best topology (e.g., best seen or best observed topology, etc.) and associated ECMP paths can be saved for comparison with the hop-by-hop latency and recorded ECMP paths from subsequent PT measurements. The expected ECMP paths and expected latency provided by RA are correlated with the measured ECMP paths and measured latency by the PT probes to detect one or more anomalies in the network with respect to the ECMP paths and their corresponding latency values. Detected network anomalies can be notified or otherwise indicated to the network operator for further troubleshooting, root-cause analysis and correcting the network issues.

The control plane 112 can build and maintain a network topology and make decisions on where traffic flows. The control plane 112 can include one or more network control appliances 114 (physical or virtual). The one or more network control appliances 114 can establish secure connections to each edge network device 118 and distribute route and policy information via a control plane 112 protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the one or more network control appliances 114 can operate as route reflectors. The one or more network control appliances 114 can also orchestrate secure connectivity in the data plane 116 between and among the edge network devices 118. For example, in some embodiments, the one or more network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the one or more network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane 116 connectivity among sites over one or more WAN transports, such as via Internet 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

Figure 2:
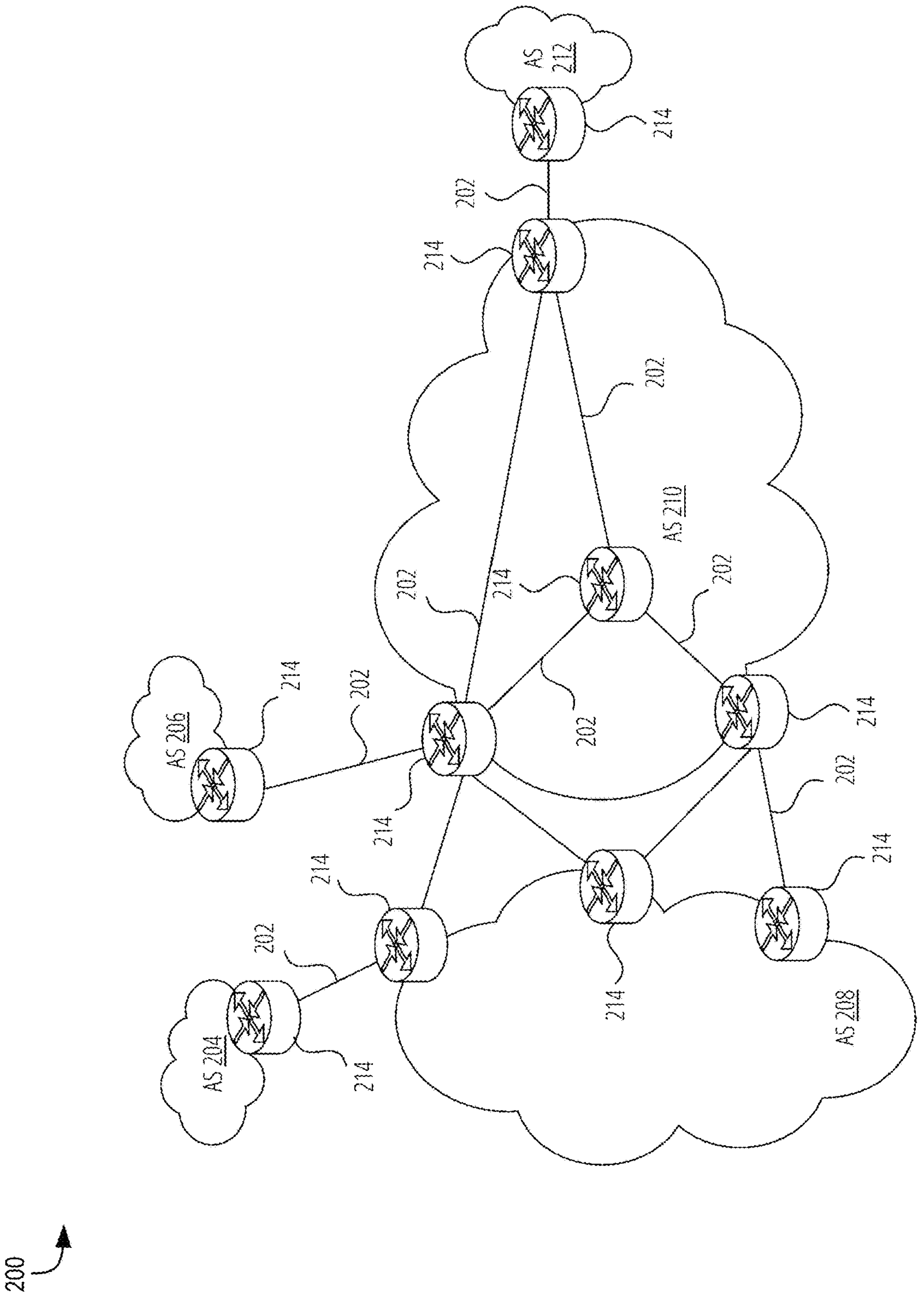
FIG. 2 illustrates an example communication network including one or more autonomous systems (ASes), in accordance with some aspects of the present technology.

FIG. 2 illustrates an example communication network 200 including one or more autonomous systems (ASes) according to some aspects of the present technology.

A communication network 200 is a geographically distributed collection of nodes interconnected by communication links 202 and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected communication networks such as the communication network 200 can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 2 is a schematic block diagram of an example communication network 200 that can include network devices 214 interconnected by various methods of communication. For instance, the communication links 202 may be any suitable combination of wired links and shared media (e.g., wireless links, Internet Exchange Points, etc.) where certain ones of the network devices 214, such as, e.g., routers, computers, etc., may be in communication with other ones of the network devices 214, e.g., based on distance, signal strength, current operational status, location, etc. Those skilled in the art will understand that any number of the network devices 214, links, etc. may be used in the computer network, and that the view shown herein is for simplicity.

Data packets (e.g., traffic and/or messages sent between the network devices 214) may be exchanged among the network devices 214 of the communication network 200 using predefined network communication protocols such as certain known wired protocols, as well as wireless protocols or other shared-media protocols where appropriate.

The communication network 200 includes a set of autonomous systems (AS) such as the AS 204, the AS 206, the AS 208, the AS 210 and the AS 212. The communication network 200 may be positioned in any suitable network environment or communications architecture that operates to manage or otherwise direct information using any appropriate routing protocol or data management standard. For example, communication network 200 may be provided in conjunction with a border gateway protocol (BGP).

As noted above, an AS may be a collection of connected Internet Protocol (IP) routing network devices such as the network devices 214 under the control of one or more network operators that presents a common, clearly defined routing policy to a network (e.g., the Internet). Usually, an AS comprises one or more of the network devices 214 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 214 located within an AS may alternatively be referred to as "forwarding network devices" or "intermediate network devices." Moreover, for illustration purposes, the AS 204, the AS 206, the AS 208, the AS 210 and the AS 212 are shown with a limited number of the network devices 214. In an actual implementation, however, an AS normally comprises numerous routers, switches, and other elements.

Each of the AS 204, the AS 206, the AS 208, the AS 210 and the AS 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among the network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (e.g., the network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., the communication links 202, may be referred to as an "AS_PATH." The AS_PATH attribute indicates the list of ASes that must be traversed to reach the address destination. For example, as illustrated in FIG. 1, the AS 204 may store an AS_PATH attribute of "204, 206, 208, 210 and 212" where the address destination is the AS 204 (or a particular IP address within AS 212). Here, the AS_PATH attribute indicates that the path to the address destination AS 212 from AS 208 passes through the AS 204, the AS 206 and the AS 210, in that order.

Although it may be preferable that all of the network devices 214 in the respective AS 204, AS 206, AS 208, AS 210 and AS 212 be configured according to BGP, in a real-world implementation, it may be unlikely that each network device communicates using BGP. Thus, the disclosed embodiments are applicable to scenarios where all of the network devices 214 in the communication network 200 are configured according to BGP, as well as scenarios where only a subset of the network devices 214 is configured as such. Moreover, between any of the ASes, there may be a single one of the communication links 202, e.g., between the AS 204 and the AS 208, as shown in FIG. 1, or there may be multiple ones of the communication links 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

The systems and techniques described herein can be used to extend and enable path tracing deployments applied to any IPv6 fabric, based on removing or otherwise eliminating the SRv6 dependencies noted above. For example, the systems and techniques can enable path tracing deployment in any IPv6 fabric based on defining a new IPv6 Option for Path Tracing to be carried in the IPv6 Destination Options Header (DOH-PT). The DOH-PT can be used to encode the PT information of the PT Source and PT Sink nodes, which represent the beginning and the end (respectively) of a path being traced. In some aspects, the systems and techniques can enable path tracing deployment in any IPv6 fabric further based on defining a new behavior at the PT Sink node to forward Path Tracing probes from the PT Sink node to the Regional Collector (RC). For example, the behavior can be triggered based on detecting the existence of the DOH-PT in the received packet at the PT Sink node.

Figure 3:
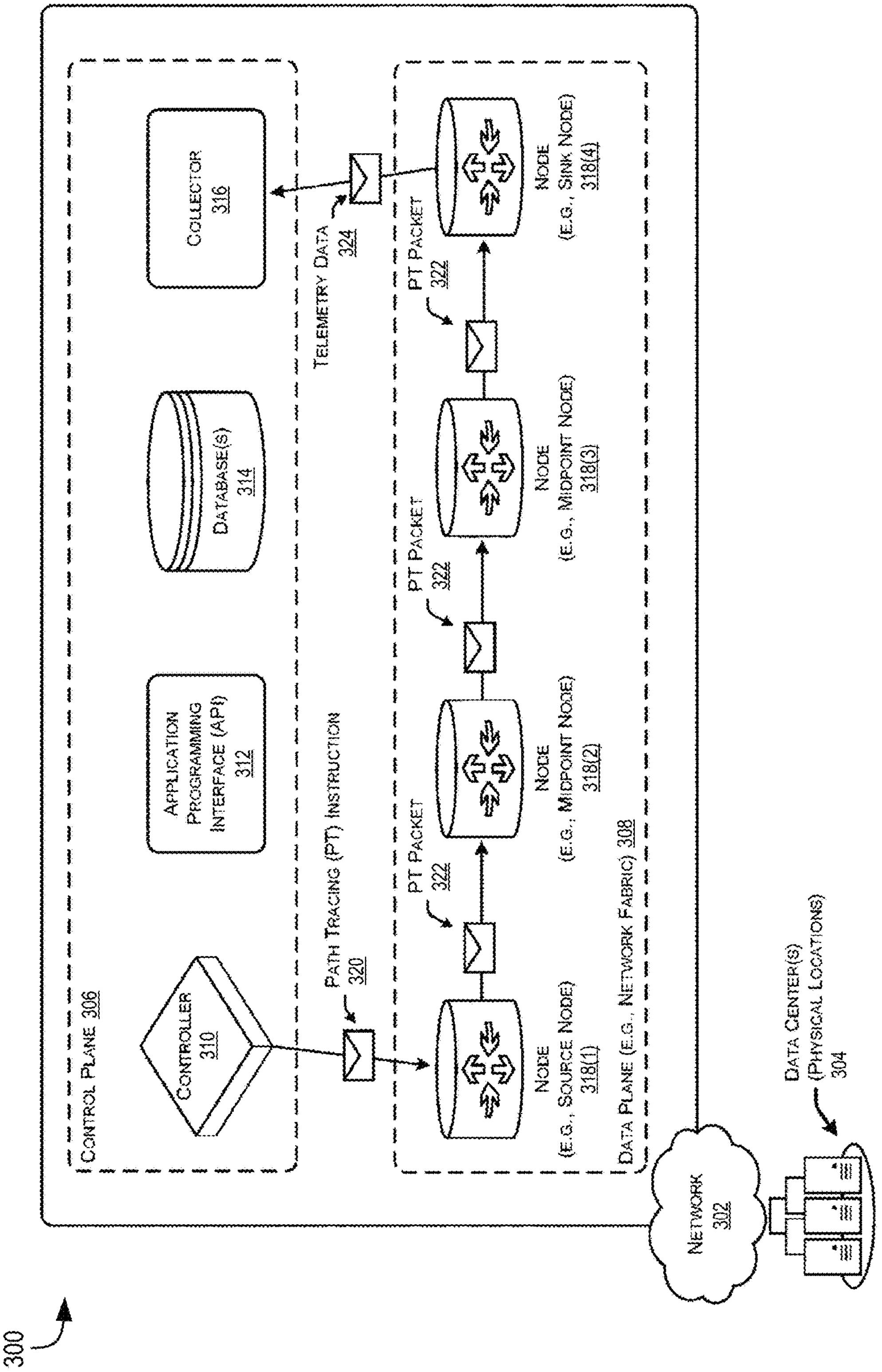
FIG. 3 illustrates a schematic view of an example system architecture of a network in which path tracing techniques can be implemented, in accordance with some aspects of the present technology.

For example, FIG. 3 illustrates a schematic view of an example system architecture 300 of a network 302 in which path tracing techniques (e.g., including the path tracing techniques for any IPv6 fabric as described herein) may be implemented. Generally, the network 302 may include devices that are housed or located in one or more data centers 304 that may be located at different physical locations. For instance, the network 302 may be supported by networks of devices in a public cloud computing platform, a private/enterprise computing platform, and/or any combination thereof. The one or more data centers 304 may be physical facilities or buildings located across geographic areas that are designated to store networked devices that are part of the network 302. The one or more data centers 304 may include various networking devices, as well as redundant or backup components and infrastructure for power supply, data communications connections, environmental controls, and various security devices. In some examples, the one or more data centers 304 may include one or more virtual data centers which are a pool or collection of cloud infrastructure resources specifically designed for enterprise needs, and/or for cloud-based service provider needs. Generally, the one or more data centers 304 (physical and/or virtual) may provide basic resources such as processor (CPU), memory (RAM), storage (disk), and networking (bandwidth). However, in some examples the devices in the network 302 may not be located in the one or more data centers 304 explicitly defined and, rather, may be located in other locations or buildings.

The network 302 may include one or more networks implemented by any viable communication technology, such as wired and/or wireless modalities and/or technologies. The network 302 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs)—both centralized and/or distributed—and/or any combination, permutation, and/or aggregation thereof. The network 302 may include devices, virtual resources, or other nodes that relay packets from one network segment to another.

The network 302 may include or otherwise be distributed (physically or logically) into a control plane 306 and a data plane 308 (e.g., a network fabric). The control plane 306 may include a controller 310, an application programming interface 312, one or more databases 314, and a collector 316. The data plane 308 may include one or more nodes 318(1)-318(4) (hereinafter referred to collectively as "nodes 318").

The controller 310 may, in some examples, assign different interface identifiers (IDs) to respective interfaces of the nodes 318. For instance, the controller 310 may assign a first interface ID to a first interface of the node 318(1), a second interface ID to a second interface of the node 318(1), a third interface ID to an interface of the node 318(2), and so forth. Additionally, the controller 310 may send a path tracing instruction 320 to the node 318(1) (which may be configured as a source node (e.g., source provider edge node)) to instruct the node 318(1) to start a telemetry collection session (for path tracing and/or delay measurements) using injected probes, in band traffic flows, or by sampling traffic flows. In some examples, the controller 310 may configure the midpoint nodes 318(2) and 318(3) with a number of bits, as well as which specific bits of a full timestamp that are to be used to encode a short timestamp in received path tracing packet 322. The controller 310 may also configure the node 318(4) (which may be configured as a sink node (e.g., egress provider edge node)) to report the telemetry data 324 collected, to the collector 316. In some examples, the controller 310 may have access to topology information of the network 302, and the nodes 318 may export their configurations to the controller 310.

In FIG. 3 the node 318(1) is configured as a source node (or headend node), such as an ingress provider edge router, a top of rack switch, a SmartNIC, etc. The source node 318(1) may receive the path tracing instruction 320 from the controller 310 and start a telemetry collection session. For instance, the source node 318(1) may allocate room in the telemetry collection packet/header of the path tracing packet 322 for a number of hops specified in the path tracing instruction 320. The source node 318(1), as part of allocating the room in the telemetry collection packet/header of the path tracing packet 322, may include an indication in the packet that instructs the downstream nodes 318(2)-318(4) as to a type of telemetry data that the downstream nodes 318(2)-318(4) are to add to the packet, as well as a specific location in the packet where the downstream nodes 318(2)-318(4) are to append the telemetry data. This may minimize the amount of work to be done by the downstream nodes 318(2)-318(4), resulting in minimal delay and/or more precise delay measurements. In some examples, the source node 318(1) may record its short interface ID of an outgoing interface used to send the path tracing packet 322. Additionally, or alternatively, the source node 318(1) may record its full timestamp, which may then be used by the collector 316 to determine full timestamps for the downstream nodes 318(2)-318(4) (which may append their short timestamps). In some instances, the source node 318(1) may record the interface ID and/or the timestamp at the end of the telemetry data carrier such that the downstream nodes 318(2)-318(4) may not have to write as deep in the packet to record their telemetry data.

In existing implementations that include the segment routing for IPv6 (SRv6) dependencies solved and avoided according to aspects of the present disclosure, the source node 318(1) may be configured to encapsulate the path tracing packet 322 with a segment routing header (SRH) such that the telemetry data may be carried in a last segment identifier field of a segment list of the segment routing header. For instance, the source node 318(1) may encapsulate the path tracing packet 322 with a segment routing header and set a value of the segment routing header "T" flag to enable the downstream nodes 318(2)-318(4) to read a Tag field of the segment routing header. Additionally, the source node 318(1) may encode the Tag field of the segment routing header to indicate what type of telemetry data is to be encoded by the downstream nodes 318(2)-318(4), as well as an offset within the telemetry carrier (the segment identifier field of the segment list) where the downstream nodes 318(2)-318(4) should write their telemetry data. The source node may encode the telemetry data in IPv6 hop-by-hop option instead of encoding in segment list in SRH. In. another example, the source node may encode the telemetry data in a TLV in SRH instead of encoding in segment list in SRH.

The midpoint nodes 318(2) and 318(3) may receive the path tracing packet 322. In turn, the midpoint nodes 318(2) and 318(3) may record their telemetry data (e.g., short timestamp, short interface ID, etc.) within the path tracing packet 322. In some examples, the midpoint nodes 318(2) and 318(3) may receive the path tracing packet 322, read the "T" flag value of the segment routing header and, if "T" is enabled, read the Tag field of the segment routing header to determine which type of telemetry data to record in the path tracing packet 322 and record the telemetry data at a location specified by an indication in the Tag field. For instance, the Tag field may include a first indication (e.g., "action" bits) that indicates the type of telemetry data and a second indication (e.g., "offset" bits) that indicates the offset where the telemetry data is to be recorded within the telemetry carrier of the path tracing packet 322. The midpoint nodes 318(2) and 318(3) may, in turn, forward the path tracing packet 322 downstream. The midpoint node may use the indication (action/offset bits) from and encode the telemetry data in IPv6 hop-by-hop option instead of encoding in segment list in SRH. In. another example, the midpoint node may use the indication (action/offset bits) from and encode the telemetry data in a TLV in SRH instead of encoding in segment list in SRH.

The sink node 318(4) (or tail end node) may, in some examples, receive the path tracing packet 322 from the midpoint node 318(3), record its own telemetry data (e.g., short timestamp, full timestamp, interface ID, etc.), and forward all of the telemetry data 324 (e.g., all of the telemetry data added by the nodes 318(1)-318(4)) to the collector 316. In some examples, if the sink node 318(4) determines, upon receiving the path tracing packet 322, that the "T" flag is enabled and segments left is equal to 1, the sink node 318(4) may export the telemetry data 324 to the collector 316, add new segment routing header and IPv6 encapsulation, and/or forward the entire packet including its headers to its destination (e.g. collector). In some examples, the path tracing packet 322 may include a uSID instruction that prompts the sink node 318(4) to perform some or all of these path tracing actions. In some instances, the path tracing actions that are associated with a specific uSID instruction may be globally defined within the network 302 and/or defined locally on the individual ones of the nodes 318. The sink node 318(4) may shift a destination address field of the path tracing packet 322 (e.g., by 16-bits) to determine that the path tracing packet 322 includes the SRv6 uSID instruction. For instance, the SRv6 uSID instruction may be included within a uSID block of the path tracing packet 322 that indicates the respective segments where the packet is to be sent.

In some examples, the collector 316 of the network 302 may receive the telemetry data 324 and determine a path taken by the path tracing packet 322 through the network 302 using the short interface IDs that each of the nodes 318 appended to the path tracing packet 322. In some instances, the collector 316 may further use the network topology information, in addition to the short interface IDs, to determine the path. The collector 316 may also, in some examples, store the determined path in the one or more databases 314 to be analyzed by other components, such as the controller 310. For instance, the controller 310 may analyze the stored path to detect anomalies in the network 302, such as a wrong short path, wrong ECMP, a failed link and/or node, etc.

Additionally, or alternatively, the collector 316 may determine the full timestamp of each of the midpoint nodes 318(2) and 318(3). The full timestamp for each of the midpoint nodes 318(2) and 318(3) may be determined by combining the recorded short timestamp and the most significant bit of the full timestamp constructed at the previous node. For instance, for the first midpoint node 318(2), the full timestamp may be determined by combining (e.g., adding) the short timestamp recorded by the first midpoint node 318(2) and the most significant bit of the full timestamp recorded by the source node 318(1).

In some examples, the collector 316, the controller 310, or an analyzer of the network 302 may analyze the collected timestamps to determine various use cases. Some of these use cases may include calculating a per-link delay, as well as leveraging the per-link delay to calculate paths for given delay SLAs. Additionally, or alternatively, the uses cases may include calculating an edge-to-edge delay (e.g., delay between the source node 318(1) and the sink node 318(4)), which may be possible in nanoseconds precision if both the source node 318(1) and the sink node 318(4) add their full timestamps to the path tracing packet 322. Additionally, or alternatively, delays for given paths may be monitored based on the collected timestamps.

As used herein, a path tracing source node (e.g., "PT source node" or "PT source") can refer to a source node, such as the source node 318(1) of FIG. 3, that starts a PT session and generates PT probe packets. The PT source can record its path tracing information in the generated PT probe packets before transmitting or otherwise sending out the PT probe packets for the PT session.

A path tracing midpoint node (e.g., "PT midpoint node" or "PT midpoint") can be a transit node that performs plain IPv6 routing (and/or SR Endpoint processing), and additionally records path tracing information in the PT header. For example, the midpoint nodes 318(2), 318(3) of FIG. 3 can be PT midpoint nodes.

A path tracing sink node (e.g., "PT sink node" or "PT sink") can refer to a node that receives PT probes sent from the PT source and including the respective PT information recorded by every PT midpoint along the path. The PT sink node forwards the received PT probes to a regional collector, after recording its own PT information to the received PT probe(s). For example, the sink node 318(4) of FIG. 3 can be a PT sink node.

A regional collector (e.g., "RC") can refer to a regional collector node that receives PT probes, parses the received PT probes, and stores the parsed probes/parsed information in a time series database. The RC uses the PT information recorded by the PT source, PT midpoints, and PT sink to construct the packet delivery path as well as the timestamp at each node along the path. For example, the collector 316 of FIG. 3 can be an RC, and the one or more databases 314 of FIG. 3 can be the time series database used by the RC to store parsed probes/parsed information.

In some examples of path tracing implementations, deployments, techniques, etc., the PT source node (e.g., PT source 318(1) of FIG. 3) acts as the instigator of the Path Tracing session. This node holds the responsibility of generating Path Tracing probes and ensuring that the necessary Path Tracing information is recorded within the Probe Packets. These packets carry the comprehensive record of the path they traverse. The PT Midpoint (e.g., PT midpoint 318(2), 318(3) of FIG. 3) operates as a transit node in the network. Its primary function involves standard IPv6 routing or SR Endpoint processing. However, it also plays a crucial role in the Path Tracing process by recording essential Path Tracing information within the PT Header. This information enriches the tracing and analysis process. The PT Sink node (e.g., PT sink 318(4) of FIG. 3) is tasked with receiving the PT probes sent from the PT Source. These probes contain information collected by each PT Midpoint encountered along the route. The PT Sink diligently captures this data and subsequently takes on the vital role of forwarding the probes to a regional collector. By doing so, the data is centralized for further analysis and examination. The Regional Collector (RC) (e.g., collector 316 of FIG. 3) serves as the central hub for collecting and managing PT probes. Upon receiving these probes, the RC performs parsing and stores them in a Timeseries Database. This database plays a critical role in constructing the entire packet delivery path and time-stamping each node's involvement along the way.

Described below are aspects of the present disclosure associated with a PT source node (e.g., such as the PT source node 318(1) of FIG. 3). As noted above, the PT source can be configured with a path tracing session. For example, a network operator or network controller (e.g., the controller 310 of FIG. 3, etc.) can configure a path tracing session at the PT source node.

The PT session configured at the PT source node can include respective configuration information corresponding to one or more of the PT session configuration parameters described below.

An SA parameter can be indicative of the source address (SA) of the PT probe packet(s). This source address can be used for establishing the origin of the Path Tracing session.

APT Sink Node parameter can be indicative of the IP address of the PT Sink node towards which the PT probe packets generated during the PT session are transmitted. For example, the PT Sink Node parameter can provide the endpoint and destination for the probes.

A Session ID parameter can be used to uniquely identify each PT session. For example, each PT session can be uniquely identified through a Session ID, which may be implemented as a 16-bit identifier that distinguishes one Probe Session from another. The Session ID parameter can be used for tracking and managing multiple concurrent sessions.

A Probe-rate parameter can be indicative of the number of probes to be generated (e.g., by the PT source node) per second as part of the PT Session. The probe-rate is the aggregate of the probes generated across different sweeping ranges (e.g., all sweeping ranges).

A Differentiated Services Code Point (DSCP)-Value parameter can be used to indicate the specific Differentiated Services Code Point value associated with the PT session. This parameter helps manage and differentiate the quality of service for the probes.

A Time-to-Live (TTL)-Value parameter can indicate the number of hops a probe can traverse before being discarded, and may be used to determine the probing depth and network coverage for the PT session and associated PT probe packets (e.g., probes).

An IPv6 Flow-Label sweeping range parameter can optionally be used to configure the PT session. For example, if set, the IPv6 Flow-Label sweeping range parameter can require the use of different Flow-Label values within the probe packets. The IPv6 Flow-Label sweeping range parameter can be specified as a range of specific Flow-Label values to be scanned, and/or can be specified as the number of different random Flow-Label values to scan.

A Midpoint Collecting Data (MCD) Stack Size parameter can be used to indicate the size of the MCD stack used to collect the MCDs of the PT midpoint nodes.

An MTU sweeping range parameter, if set or otherwise enabled, can specify that any payload of the PT probe packets must be included at the end of the probe packets (e.g., to test different packet sizes, etc.). In some examples, the MTU sweeping range parameter can be indicated as a list of specific packet sizes, or as an increment or incremental value.

For each configured PT session, according to the probe-rate, the PT Source can be used to generate one or more PT probe packets. For example, the pseudocode below corresponds to an example of PT probe packet generation by the PT Source for a PT session:

S01. Generate a new IPv6 packet
S02. Set the IPv6 SA (source address) as per PT Probing session configuration
S03. Set the IPv6 DA (destination address) to the address of the PT Sink node
S04. Set the IPv6 Next Header field to zero (Hop-by-Hop (HbH))
S05. Set the DSCP and Flow Label values as per PT Probing Session configuration
S06. Append an IPv6 Hop-by-Hop header with path tracing enabled (HbH-PT header)
S07. Set all bits of the HbH-PTMCD Stack to zero
S08. Append an IPv6 Destinations Option header with DOH-PT
S09. Set the Next Header field of the IPv6 Destinations Options Header to 59 (IPv6 No Next Header)
S10. Add padding bytes after the IPv6 Destinations Option header to reach the desired packet size as per the MTU sweeping range configuration
S15. Set the session ID field of the DOH-PT as per PT Probing Session configuration
S16. Perform an IPv6 FIB lookup to determine the Outgoing Interface (IFACE-OUT) on which packet will be forwarded
S17. Record Transmit 64-bit timestamp (SRC.T64) in the T64 field of the DOH-PT
S18. Record IFACE-OUT ID (SRC.OIF) in the IF_ID field of the DOH-PT
S19. Record IFACE-OUT Load (SRC.OIL) in the IF_LD field of the DOH-PT
S20. Forward the packet via IFACE-OUT In one illustrative example, the systems and techniques described herein can provide path tracing techniques that are fully compatible with the behaviors defined in the SRv6 path tracing standard, and for all PT midpoint nodes that lie along the path between the PT source and PT sink nodes. In some aspects, the PT midpoint nodes are configured to record their respective PT information and/or MCD stack within (e.g., using) a hop-by-hop path tracing header (HbH-PT header), such as the HbH-PT header 430 of FIG. 4.

Figure 4:
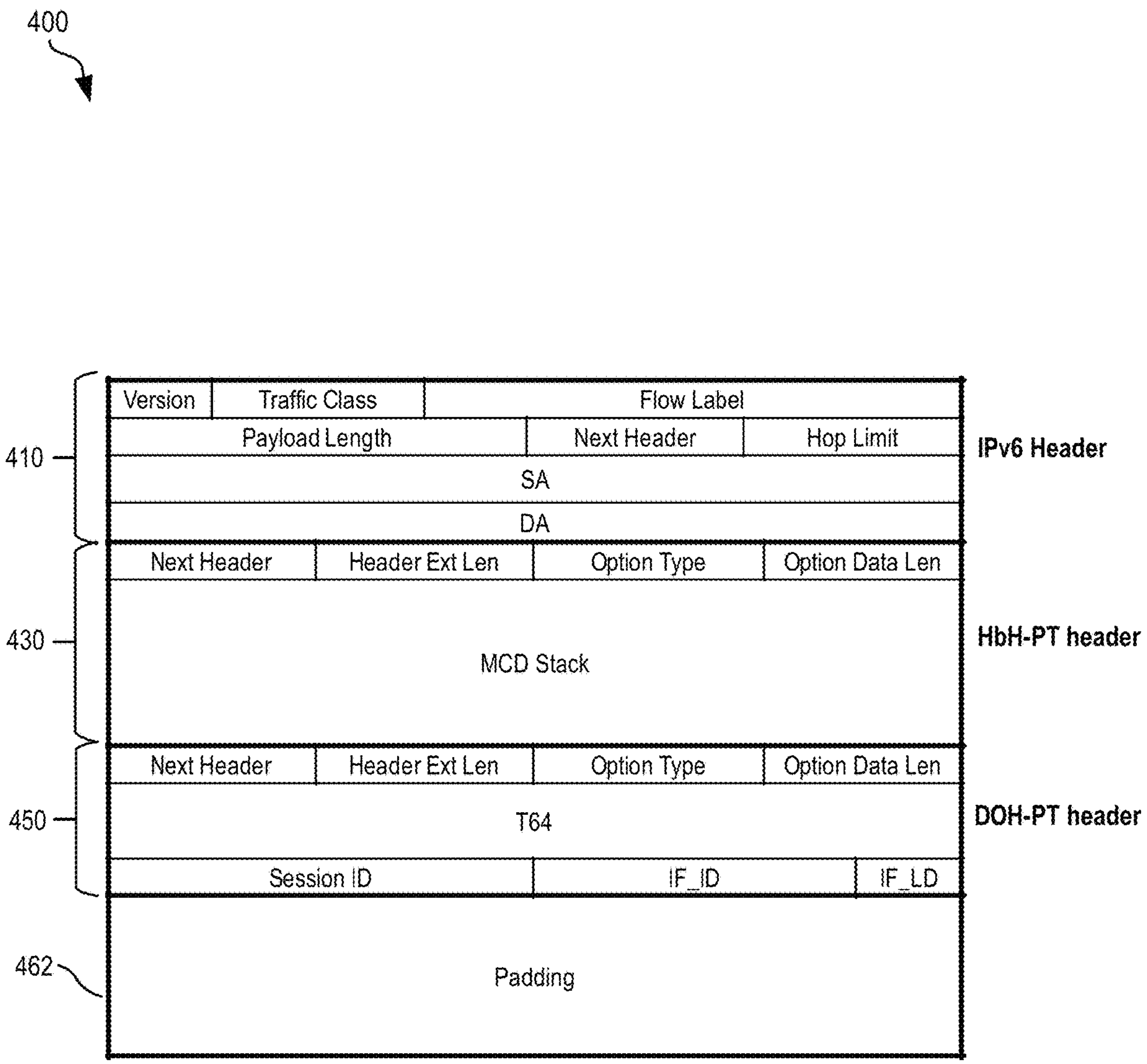
FIG. 4 illustrates an example of a path tracing (PT) probe packet data structure that may be generated by a PT source node, in accordance with some aspects of the present technology.

FIG. 4 is a diagram illustrating an example of a PT probe packet 400, which may be generated by the PT source node associated with or configured for a PT session. For example, the PT probe packet 400 can correspond to PT probe packets (e.g., PT probes) generated by a PT source node the same as or similar to the PT source 318(1) of FIG. 3. In some example, the PT probe packet 400 can correspond to the path tracing packet 322 of FIG. 3.

In some embodiments, the PT source node can be configured to generate the PT probe packet 400 to include an IPv6 header 410, a Hop-by-Hop header with Path Tracing Option (HbH-PT header 430), and an IPv6 Destination Options header with Path Tracing Option (DOH-PT header 450).

The IPv6 header 410 of the PT probe packet 400 generated by the PT source node can include various fields that are associated with forwarding of the PT probe packet 400. For example, the IPv6 header 410 can include one or more fields that decide the packet forwarding, such as the 'SA' source address field, the 'DA' destination address field, a DSCP field, the 'Flow Label' field, etc. As illustrated in the example of FIG. 4, the IPv6 header 410 may additionally include a 'Version' field, a 'Traffic Class' field, a 'Payload Length' field, a 'Next Header' field, a 'Hop Limit' field, etc.

The HbH-PT header 430 of the PT probe packet 400 generated by the PT source node can include an 'MCD stack' field corresponding to the MCD stack used by the PT Midpoints along the packet path to record their respective MCDs. For example, each PT midpoint node along the packet path can record its respective midpoint compressed data (MCD) to the 'MCD stack' field of the HbH-PT header 430 of the PT probe packet 400 transmitted from the PT source node. As illustrated in the example of FIG. 4, the HbH-PT header 430 can additionally include a 'Next Header' field, a 'Header Extension Length' field, an 'Option Type' field, and an 'Option Data Length' field, etc. In some aspects, the systems and techniques described herein can implement the PT probe packet 400 to perform path tracing in any IPv6 fabric, while utilizing an HbH-PT header 430 that has the same format as in the SRv6 path tracing techniques, to allow existing PT midpoint node behavior(s) to continue to be implemented and compatible.

In some aspects, the DOH-PT header 450 of the PT probe packet 400 can be used by the PT source node to record the Path Tracing data (e.g., PT information) corresponding to the PT source node. For example, the DOH-PT header 450 can be populated with the PT information of the PT source node according to the operations of the pseudocode example presented above (e.g., the above pseudocode example of PT probe packet generation by the PT source node for a PT session). As illustrated in the example of FIG. 4, the DOH-PT header 450 can include a 'Next Header' field, a 'Header Extension Length' field, an 'Option Type' field, an 'Option Data Length' field, a 'T64' field, a 'Session ID' field, an 'IF_ID' field, and an 'IF_LD' field.

In one illustrative example, the 'Next Header' field of the DOH-PT header 450 can be set to a value of 59 (e.g., corresponding to IPv6 No Next Header), as in step S09 of the pseudocode example above.

In some embodiments, the PT probe packet 400 can include one or more padding bytes 462, corresponding to the padding bytes added after the DOH-PT header 450 in order to reach a desired or configured packet size for the PT probe packet 400 as per the MTU sweeping range configuration (e.g., corresponding to step S10 of the pseudocode example above).

In some examples, the 'Session ID' field of the DOH-PT header 450 can be set based on the PT probing session configuration, as in step S15 of the pseudocode example above.

In some examples, the 'T64' field of the DOH-PT header 450 can be used to record a Transmit 64-bit timestamp (SRC.T64), as in step S17 of the pseudocode example above.

In some examples, the 'IF_ID' field of the DOH-PT header 450 can be used to record an outgoing interface (IFACE-OUT) determined by the PT source node using an IPv6 FIB lookup for the forwarding of the PT probe packet 400, as in step S18 of the pseudocode example above. For instance, the 'IF_ID' field of the DOH-PT header 450 can be used to record an IFACE-OUT ID (SRC.OIF).

In some aspects, the 'IF_LD' field of the DOH-PT header 450 can be used to record an IFACE-OUT Load (SRC.OIL) determined by the PT source node, as in step S19 of the pseudocode example above.

In one illustrative example, the DOH-PT header 450 can replace the SRH PT-TLV used in existing path tracing techniques with SRv6 dependency, and accordingly, the DOH-PT header 450 can be used by the systems and techniques described herein to remove the path tracing SRv6 dependency and allow for the deployment of path tracing in any IPv6 network fabric.

In some aspects, every PT midpoint node along the packet delivery path from the PT source node to the PT sink node (e.g., the PT midpoint nodes 318(2), 318(3) along the packet delivery path from the PT source node 318(1) to the PT sink node 318(4) of FIG. 3) can be configured to record its respective PT information into the HbH-PT header 430 of the PT probe packet 400. As noted previously, the respective PT information of each PT midpoint node is also referred to as midpoint compressed data (MCD).

The MCD/respective PT information of each PT midpoint node can be recorded to the 'MCD Stack' field of the HbH-PT header 430 of the PT probe packet 400. In one illustrative example, the respective MCD/PT information of each PT midpoint node can be indicative of an MCD.OIF (Outgoing Interface ID), an MCD.OIL (Outgoing Interface Load), and an MCD.TTS (Truncated Timestamp).

The Midpoint Compressed Data Outgoing Interface ID (MCD.OIF) is a 12-bit interface identifier associated with the egress physical port of the router. The interface ID (e.g., MCD.OIF) for each PT midpoint node can be assigned through a centralized algorithm. The interface ID (e.g., MCD.OIF) is not necessarily globally unique across the entire network (e.g., the entire IPv6 network fabric in which the presently disclosed path tracing systems and techniques are deployed). Instead, the central algorithm can be used to ensure that the end-to-end path can be deterministically detected for any PT probe packet 400 and corresponding path from a PT source, one or more PT midpoints, to a PT sink, for example where the deterministic detection is based on the chain of Interface IDs.

The Midpoint Compressed Data Outgoing Interface Load (MCD.OIL) is a 4-bit representation of the egress interface load. This representation may utilize a logarithmic scale, allowing for increased granularity, particularly as the load increases or becomes higher.

The Midpoint Compressed Data Truncated Timestamp (MCD.TTS) is a timestamp embedded in the data, signifying the moment when the packet departs from the router. In some embodiments, the MCD.TTS is an 8-bit timestamp representing the time at which the PT probe packet 400 leaves the router. The 8-bit TTS can hold various levels of significance, based on the type of link involved (e.g., known as Time Template). In some examples, the MCD.TTS provides a temporal reference point, enabling precise tracking and coordination of packet movements. Each egress port within the device can be configured with one Time Template.

Described below are aspects of the presently disclosed IPv6 path tracing techniques associated with a PT sink node of the PT session (e.g., such as the PT sink node 318(4) associated with the PT source node 318(1) of FIG. 3, etc.).

Figure 5A:
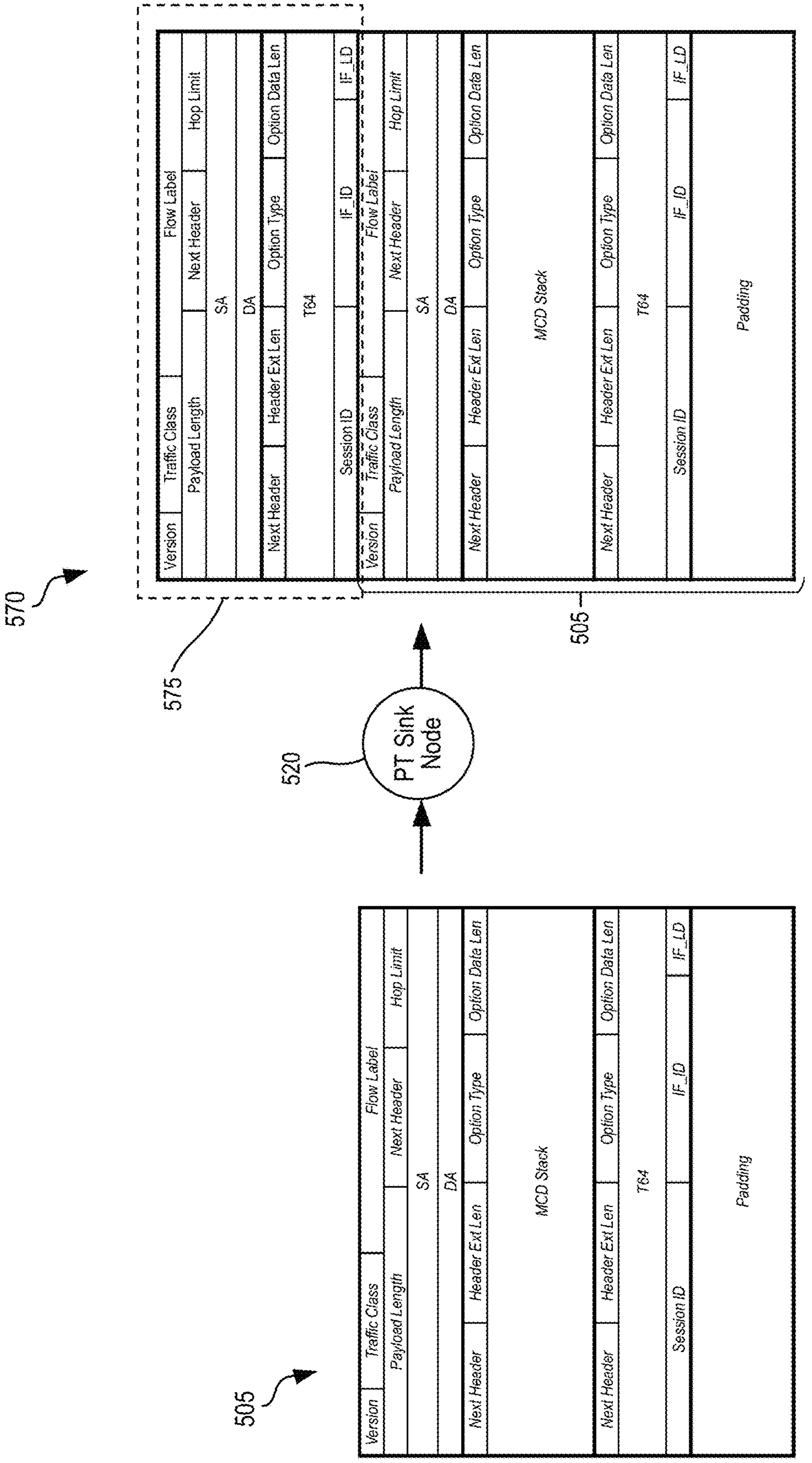
FIG. 5A illustrates an example of a PT probe packet data structure before and after encapsulation by a PT sink node, in accordance with some aspects of the present technology.

FIGS. 5A-5B illustrate examples of a PT probe packet encapsulated by a sink node according to some aspects of the present technology. For example, FIG. 5A is a diagram illustrating an example of a POT probe packet data structure before and after encapsulation by a PT sink node 520. FIG. 5B is a diagram illustrating details of the encapsulated PT probe packet data structure shown in FIG. 5A.

In some aspects, a PT probe packet 505, before encapsulation by the PT sink node 520, can be the same as or similar to the PT probe packet 400 of FIG. 4. The PT probe packet 505 received at the PT sink node 520 has completed traversal of the path from the PT source node, through the PT midpoint nodes, and to the PT sink node. Accordingly, the PT probe packet 505 can have its HbH-PT header (and MCD stack thereof) populated with the respective PT information/MCDs of each PT midpoint node traversed on the path to the PT sink node 520.

In one illustrative example, the systems and techniques described herein can be used to implement path tracing for any IPv6 network fabric, and without SRv6 dependency, based on defining a new behavior at the PT sink node (e.g., PT sink node 520 of FIG. 5A, PT sink node 318(4) of FIG. 3, etc.). For example, the systems and techniques can implement Timestamp, Encapsulation, and Forward (TEF) at the PT sink node 520, based on the presence (e.g., existence) of the DOH-PT header within the PT probe packet 505 received at the PT sink node 520. The TEF behavior configured for the PT sink node 520 can serves as a replacement for the existing SRv6 End.B6.TEF behavior in the existing path tracing techniques with SRv6 dependencies.

In one illustrative example, the systems and techniques described herein can configure the PT sink node 520 to implement operations corresponding to the pseudocode example below for PT Sink behavior. In some embodiments, the pseudocode example PT Sink behavior can be triggered by the PT sink node 520 receiving a PT probe packet 505 having an IPv6 DA that comprises or matches a local IPv6 address of the PT sink node 520 (e.g., loopback), and the PT probe packet 505 also including the DOH-PT header (e.g., DOH-PT header 450 of FIG. 4). The PT Sink behavior pseudocode example is provided below:

S01. Record Rx 64-bit timestamp (SNK.T64)
S02. Record incoming interface ID (SNK.IIF)
S03. Record incoming interface Load (SNK.IIL)
S04. Push a new IPv6 header
S05. Set the IPv6 SA to the Sink node loopback
S06. Set the IPv6 DA to the Regional Collector (RC) address
S07. Append an IPv6 Destinations Option header with DOH-PT
S08. Set the Next Header field of the IPv6 Destinations Options Header to 41 (IPv6 header)
S09. Set the session ID field of the DOH-PT
S10. Write SNK.T64 in the T64 field of the DOH-PT
S15. Write SNK.IIF in the IF_ID field of the DOH-PT
S16. Write SNK.IIL in the IF_LD field of the DPH-PT
S17. Submit the packet to the egress IPv6 FIB lookup for transmission to the new destination The TEF behavior of the PT sink node 520, as outlined in the example pseudocode above, serves as a replacement for the SRv6 End.B6.TEF behavior that is otherwise present in the existing path tracing techniques that have SRv6 dependencies. Accordingly, the TEF behavior of the PT sink node 520 to encapsulate the received PT probe packet 505 with an additional IPv6 header 575 (e.g., thereby generating the encapsulated PT probe packet 570 comprising the received PT probe packet 505 and the additional IPv6 header 575).

In some aspects, the PT probe packet 505 can be referred to as the received PT probe packet, and the encapsulated PT probe packet 570 can be referred to as the updated PT probe packet.

The encapsulated PT probe packet 570 of FIG. 5A is shown in greater detail in the example data structure of FIG. 5B. For example, the encapsulated PT probe packet 570 can include the received PT probe packet 505 that is received by the PT sink node 520. The received PT probe packet 505 portion of the encapsulated PT probe packet 570 includes the IPv6 header 510-1 created by the PT source node (e.g., the same as or similar to the IPv6 header 410 of FIG. 4), the HbH-PT header 530-1 created by the PT source node and populated by the PT midpoint nodes on the path to the PT sink node 520 (e.g., the same as or similar to the HbH-PT header 430 of FIG. 4), a first DOH-PT header 550-1 created by the PT source node (e.g., the same as or similar to the DOH-PT header 450 of FIG. 4), and one or more padding bytes 562 (e.g., the same as or similar to the one or more padding bytes 462 of FIG. 4).

Based on receiving the PT probe packet 505, the PT sink node 520 can first generate an updated PT probe packet by adding a second DOH-PT header 550-2 to the received PT probe packet 505. For example, the updated PT probe packet can comprise the received PT probe packet 505 and the second DOH-PT header 550-2. The second DOH-PT header 550-2 can have a data structure that is the same as or similar to the data structure of the first DOH-PT header 550-1, and/or the DOH-PT header 450 of FIG. 4, etc.

In some embodiments, the updated PT probe packet is generated by the PT sink node 520 appending the second DOH-PT header 550-2, as in step S07 of the PT Sink pseudocode above. The updated PT probe packet can be generated by the PT sink node 520 to include the second DOH-PT header 550-2, where the second DOH-PT header 550-2 includes or is otherwise indicative of the PT information of the PT sink node 520. Accordingly, the updated PT probe packet includes the PT information of the PT source node (e.g., within the first DOH-PT header 550-1) and includes the PT information of the PT sink node 520 (e.g., within the second DOH-PT header 550-2).

The PT information of the PT sink node 520 can be written to the second DOH-PT header 550-2 added to the received PT probe packet 505 to generate the updated PT probe packet, according to steps S08, S09, S10, S15, and S16 of the pseudocode above for the PT sink node behavior.

For example, the second DOH-PT header 550-2 can have a 'Next Header' field that is set to a value of 41 (e.g., IPv6 header), as in step S08 of the pseudocode above for the PT sink node behavior.

The second DOH-PT header 550-2 can have its 'Session ID' field set or configured, as in step S09 of the pseudocode above for the PT sink node behavior.

The second DOH-PT header 550-2 can have its 'T64' field written to the value of SNK.T64, as in step S10 of the pseudocode above. The value of SNK.T64 can be the Rx 64-bit time stamp determined in step S01 of the pseudocode above for the PT sink node behavior (e.g., the received timestamp corresponding to the time at which the PT sink node 520 receives the received PT probe packet 505).

The second DOH-PT header 550-2 can have its 'IF-ID' field written to the value of SNK.IIF (the incoming interface ID determined and recorded in step S02 of the pseudocode above), as in step S15 of the pseudocode above for the PT sink node behavior.

The second DOH-PT header 550-2 can have its 'IF-LD' field written to the value of SNK.IIL (the incoming interface Load determined and recorded in step S03 of the pseudocode above), as in step S16 of the pseudocode above for the PT sink node behavior.

In some embodiments, the PT sink node 520 TEF behavior can additionally cause the PT sink node 520 to encapsulate the updated PT probe packet (e.g., the updated PT probe packet comprising the received PT probe packet 505 and the second DOH-PT header 550-2 with the PT information of the PT sink node 520) with an additional IPv6 header 510-2.

The additional IPv6 header 510-2 can have a data structure that is the same as or similar to the IPv6 header 510-1 of FIGS. 5A and 5B, and/or that is the same as or similar to the IPv6 header 410 of FIG. 4, etc. The additional IPv6 header 510-2 and the second DOH-PT header 550-2 can be included in header 575 added to the received PT probe packet 505 by the PT sink node 520.

In some aspects, the additional IPv6 header 510-2 from the encapsulation performed by the TEF behavior configured for the PT sink node 520 can be used to encode the transport information for forwarding the PT probe packet 505 from the PT sink node 520 to the Regional Collector (RC) node (e.g., such as the collector 316 of FIG. 3, etc.) for path tracing processing and/or analysis.

In some embodiments, the PT information of the PT sink node 520 and the PT source node are encoded in two separate DOH-PT headers, as shown in the example of FIG. 2 (e.g., the first DOH-PT header 550-1 and the second DOH-PT header 550-2, respectively).

In some embodiments, the size of the DOH-PT header used in the original PT probe packet from the PT source (e.g., the first DOH-PT header 550-1 of the received PT probe packet 505 of FIG. 5A-5B, the DOH-PT header 450 of the PT probe packet 400 of FIG. 4, etc.) can be expanded, to be large enough to store the PT information from both PT source and PT sink within the single DOH-PT header originally created by the PT source node for the PT probe packet 400 shown in FIG. 4. In this example, the PT sink node 520 does not need to create the additional (e.g., second DOH-PT header 550-2) at the encapsulation step, and can instead encode its respective PT information into the same DOH-PT header (e.g., the first DOH-PT header 550-1) that already includes the PT information of the PT source node. In this example, the encapsulated PT probe packet 570 from the PT sink node 520 to the RC node is encapsulated with the additional IPv6 header 510-2 but not the second DOH-PT header 550-2 (e.g., as the original/first DOH-PT header 550-1 is instead updated in the encapsulated PT probe packet 570 to include both the PT information of the PT source node and the PT information of the PT sink node 520

FIG. 6 illustrates a flowchart diagram of an example process 600 for deploying path tracing within a network environment (e.g., any IPv6 network fabric, etc.), in accordance with some aspects of the present technology. It is also understood that the example process 600 of FIG. 6 and/or various other processes described herein can also be implemented using one or more processors and memories having computer-readable instructions stored thereon, which when executed by the one or more processors cause the one or more processors to perform operations including some or all of process 600. Although process 600 depicts a particular sequence of operations, the sequence may be altered without departing from the scope of the present disclosure. For example, some of the operations depicted may be performed in parallel or in a different sequence that does not materially affect the function of process 600. In other examples, different components of an example device or system that implements process 600 may perform functions at substantially the same time or in a specific sequence.

At block 602, the process 600 can include establishing a path tracing session corresponding to the transmission of a plurality of path tracing (PT) probe packets from a PT source node, wherein the PT source node is included in an IPv6 network fabric.

For example, the path tracing session can be established and/or configured by a controller, such as the controller 310 of FIG. 3. The plurality of PT probe packets can be the same as or similar to the path tracing packet 322 of FIG. 3, the PT probe packet 400 of FIG. 4, the PT probe packet 505 of FIGS. 5A-5B, etc.

The PT source node can be the same as or similar to the PT source node 318(1) of FIG. 3. The PT source node can be associated with a PT sink node, the same as or similar to the PT sink node 318(4) of FIG. 3 and/or the PT sink node 520 of FIGS. 5A-5B. Between the PT source node and the PT sink node, a path can include one or more (or a plurality of) PT midpoint nodes, such as the PT midpoint nodes 318(2), 318(3) of FIG. 3.

In some aspects, the PT source node is configured to transmit a PT probe packet with the first DOH-PT header that encodes path tracing information of the PT source node. For example, the PT source node 318(1) of FIG. 3 can transmit the PT probe packet 400 of FIG. 4, with a first DOH-PT header the same as or similar to the DOH-PT header 450 of FIG. 4 and/or first DOH-PT header 550-1 of FIGS. 5A-5B.

In some examples, the PT sink node and the PT source node are included in the same IPv6 network fabric. In some examples, the IPv6 network fabric is not a Segment Routing over IPv6 (SRv6) network fabric. In some examples, the PT probe packet does not include a Segment Routing Header (SRH) path tracing Type-Length-Value (TLV) field (SRH PT-TLV field).

At block 604, the process 600 can include receiving a PT probe packet with a first IPv6 Destination Options Header with Path Tracing Option (DOH-PT) header that encodes path tracing information of the PT source node, wherein the received PT probe packet is further indicative of respective path tracing information for each PT midpoint node of a plurality of PT midpoint nodes along a path from the PT source node to a PT sink node included in the IPv6 network fabric.

For example, the PT probe packet with the first DOH-PT header can be received by the PT sink node 520 of FIG. 5A, and can be received by the PT sink node from the PT source node (e.g., PT source node 318(1) of FIG. 3, etc.). In some examples, the received PT probe packet with the first DOH-PT header can further include a Hop-by-Hop Path Tracing (HbH-PT) header indicative of the respective path tracing information for each PT midpoint node of the plurality of PT midpoint nodes along the path from the PT source node to the PT sink node.

The received PT probe packet can be the same as or similar to the received PT probe packet 505 of FIGS. 5A-5B, and/or the PT probe packet 400 of FIG. 4, and can be indicative of the respective path tracing for each PT midpoint node of the plurality of PT midpoint nodes (e.g., PT midpoint nodes 318(2), 318(3) of FIG. 3) based on including the HbH-PT header 530-1 of FIGS. 5A-5B (e.g., which can be the same as or similar to the HbH-PT header 430 of the PT probe packet 400 of FIG. 4).

At block 606, the process 600 can include updating the received PT probe packet to include a second DOH-PT header that encodes path tracing information of the PT sink node, wherein an updated PT probe packet includes the first DOH-PT header and the second DOH-PT header.

For example, the received PT probe packet can be updated by the PT sink node (e.g., PT sink node 520 of FIG. 5A). The second DOH-PT header can be the same as or similar to the second DOH-PT header 550-2 of FIGS. 5A-5B. In some aspects, updating the received PT probe packet with the first DOH-PT header comprises appending, by the PT sink node, the second DOH-PT header to the received PT probe packet with the first DOH-PT header.

In some examples, the PT sink node generates the updated PT probe packet based on appending the second DOH-PT header to the first DOH-PT header of the received PT probe packet, and wherein the second DOH-PT header is separate from the first DOH-PT header.

In some examples, the PT sink node generates the updated PT probe packet to include the second DOH-PT header within the first DOH-PT header.

At block 608, the process 600 can include encapsulating the updated PT probe packet with an additional IPv6 header corresponding to forwarding information of a collector node. For example, the additional IPv6 header can be the same as or similar to the additional IPv6 header 510-2 of FIGS. 5A-5B. The encapsulating can be performed by the PT sink node (e.g., PT sink node 520 of FIG. 5A). In some examples, encapsulating the updated PT probe packet with the additional IPv6 header is performed by the PT sink node. The collector node can be a path tracing Regional Collector (RC) node associated with one or more of the PT sink node or the PT source node. For instance, the collector node can be a regional collector (RC), the same as or similar to the collector 316 of FIG. 3.

Figure 7:
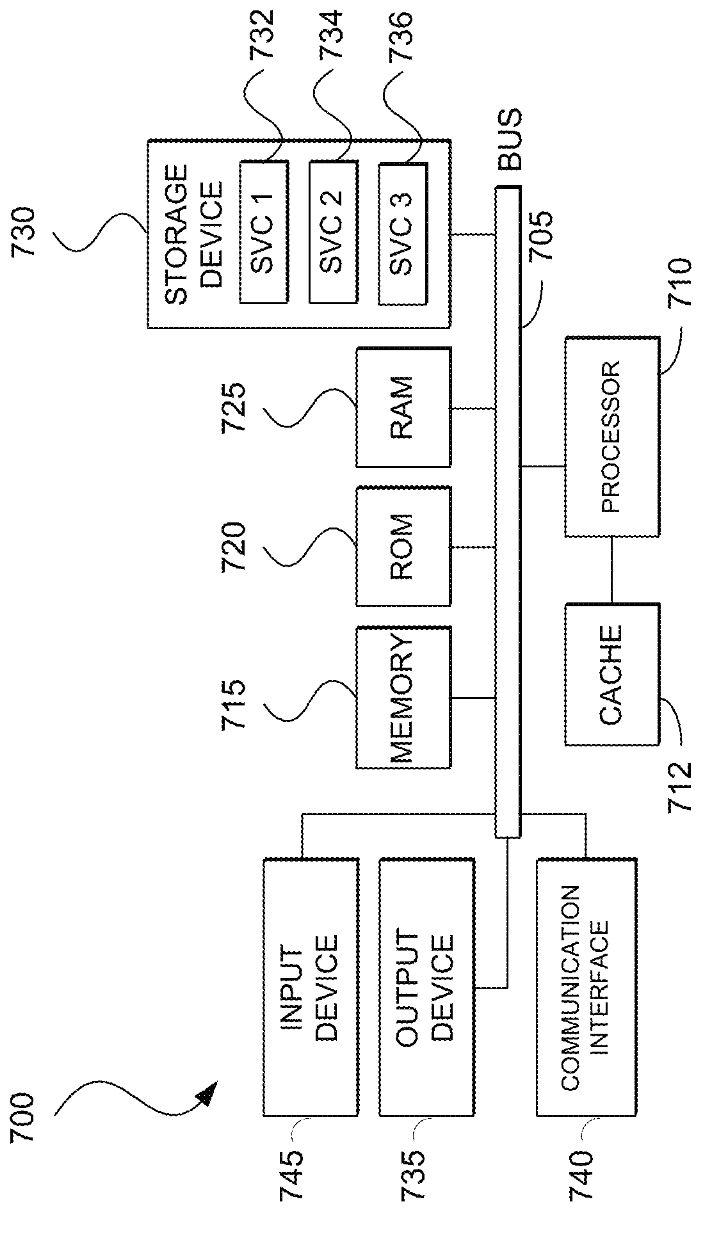
FIG. 7 is a block diagram illustrating an example of a computing system for implementing aspects of the present technology and aspects described herein.

FIG. 7 illustrates a computing system architecture, according to some aspects of the present disclosure. Components of computing system 700 are in electrical communication with each other using a connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) such as processor 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for path tracing, the method comprising:

establishing a path tracing session corresponding to transmission of a plurality of path tracing probe packets from a path tracing source node, wherein the path tracing source node is included in an IPV6 network fabric;

receiving a path tracing probe packet with a first IPV6 Destination Options Header with Path Tracing Option (DOH-PT) header that encodes path tracing information of the path tracing source node, wherein the path tracing probe packet is further indicative of respective path tracing information for each path tracing midpoint node of a plurality of path tracing midpoint nodes along a path from the path tracing source node to a path tracing sink node included in the IPV6 network fabric;

updating the path tracing probe packet to include a second DOH-PT header that encodes path tracing information of the path tracing sink node, wherein updating the path tracing probe packet includes appending the second DOH-PT header to the path tracing probe packet with the first DOH-PT header, and an updated path tracing probe packet includes the first DOH-PT header and the second DOH-PT header; and encapsulating the updated path tracing probe packet with an additional IPV6 header corresponding to forwarding information of a collector node.

2. The method of claim 1, wherein the path tracing probe packet with the first DOH-PT header is received by the path tracing sink node and from the path tracing source node.

3. The method of claim 1, wherein the collector node is a path tracing Regional Collector node associated with one or more of the path tracing sink node or the path tracing source node.

4. The method of claim 1, wherein the path tracing probe packet with the first DOH-PT header further includes a Hop-by-Hop Path Tracing header indicative of the respective path tracing information for each path tracing midpoint node of the plurality of path tracing midpoint nodes along the path from the path tracing source node to the path tracing sink node.

5. The method of claim 1, wherein encapsulating the updated path tracing probe packet with the additional IPV6 header is performed by the path tracing sink node.

6. The method of claim 1, further comprising:

transmitting, by the path tracing source node, the path tracing probe packet with the first DOH-PT header that encodes path tracing information of the path tracing source node.

7. The method of claim 1, wherein the path tracing sink node generates the updated path tracing probe packet based on appending the second DOH-PT header to the first DOH-PT header of the path tracing probe packet, and wherein the second DOH-PT header is separate from the first DOH-PT header.

8. The method of claim 1, wherein the path tracing sink node generates the updated path tracing probe packet to include the second DOH-PT header within the first DOH-PT header.

9. The method of claim 1, wherein the path tracing sink node and the path tracing source node are included in a same IPV6 network fabric.

10. The method of claim 1, wherein the IPV6 network fabric is not a Segment Routing over IPv6 network fabric.

11. The method of claim 10, wherein the path tracing probe packet does not include a Segment Routing Header path tracing Type-Length-Value field.

12. A system comprising:
one or more processors; and
one or more computer-readable storage media having computer-readable instructions stored thereon, wherein the computer-readable instructions, when executed by the one or more processors, cause the one or more processors to:
establish a path tracing session corresponding to transmission of a plurality of path tracing probe packets from a path tracing source node, wherein the path tracing source node is included in an IPV6 network fabric;
receive a path tracing probe packet with a first IPV6 Destination Options Header with Path Tracing Option (DOH-PT) header that encodes path tracing information of the path tracing source node, wherein the path tracing probe packet is further indicative of respective path tracing information for each path tracing midpoint node of a plurality of path tracing midpoint nodes along a path from the path tracing source node to a path tracing sink node included in the IPV6 network fabric;
update the path tracing probe packet to include a second DOH-PT header that encodes path tracing information of the path tracing sink node, wherein
updating the path tracing probe packet includes appending the second DOH-PT header to the path tracing probe packet with the first DOH-PT header, and
an updated path tracing probe packet includes the first DOH-PT header and the second DOH-PT header; and
encapsulate the updated path tracing probe packet with an additional IPv6 header corresponding to forwarding information of a collector node.

13. The system of claim 12, wherein the path tracing probe packet with the first DOH-PT header is received by the path tracing sink node and from the path tracing source node.

14. The system of claim 12, wherein the path tracing probe packet with the first DOH-PT header further includes a Hop-by-Hop Path Tracing header indicative of the respective path tracing information for each path tracing midpoint node of the plurality of path tracing midpoint nodes along the path from the path tracing source node to the path tracing sink node.

15. The system of claim 12, wherein, to update the path tracing probe packet, the one or more processors are configured to:
generate, by the path tracing sink node, the updated path tracing probe packet to include the second DOH-PT header within information of the first DOH-PT header.

16. The system of claim 12, wherein the path tracing sink node is configured to encapsulate the updated path tracing probe packet with the additional IPV6 header.

17. The system of claim 12, wherein the IPV6 network fabric is not a Segment Routing over IPv6 network fabric.

18. One or more non-transitory computer-readable media comprising computer-readable instructions, which when executed by one or more processors, cause the one or more processors to:
establish a path tracing session corresponding to transmission of a plurality of path tracing probe packets from a path tracing source node, wherein the path tracing source node is included in an IPV6 network fabric;
receive a path tracing probe packet with a first IPV6 Destination Options Header with Path Tracing Option (DOH-PT) header that encodes path tracing information of the path tracing source node, wherein the path tracing probe packet is further indicative of respective path tracing information for each path tracing midpoint node of a plurality of path tracing midpoint nodes along a path from the path tracing source node to a path tracing sink node included in the IPV6 network fabric;
update the path tracing probe packet to include a second DOH-PT header that encodes path tracing information of the path tracing sink node, wherein
updating the path tracing probe packet includes appending the second DOH-PT header to the path tracing probe packet with the first DOH-PT header, and
an updated path tracing probe packet includes the first DOH-PT header and the second DOH-PT header; and
encapsulate the updated path tracing probe packet with an additional IPV6 header corresponding to forwarding information of a collector node.

* * * * *